UNITED STATES PATENT OFFICE.

DAMON R. AVERILL, OF NEW CENTREVILLE, NEW YORK, ASSIGNOR TO THE AVERILL CHEMICAL PAINT COMPANY, OF NEW YORK CITY.

IMPROVEMENT IN PAINTS.

Specification forming part of Letters Patent No. 66,773, dated July 16, 1867; reissue No. 3,051, dated July 28, 1868; reissues Nos. 3,597, 3,598, 3,599, 3,600, and 3,601, dated August 17, 1869; reissue No. 5,695, dated December 23, 1873; reissue No. 7,031, dated April 4, 1876; application filed February 3, 1876.

*To all whom it may concern:*

Be it known that D. R. AVERILL, formerly of Newburg, Cuyahoga county, Ohio, now of New Centreville, Oswego county, New York, did invent an Improvement in Paint; and we, D. R. AVERILL and the AVERILL CHEMICAL PAINT COMPANY, of the city of New York, do hereby declare that the following is a full and complete description of one example of the same, viz., of the ingredients and the manner of compounding them.

The object of this invention is to provide a mixed liquid paint, prepared ready for use, which can be put up in suitable packages for transportation or storage, as a new article of commerce and manufacture.

In the use of oleaginous metallic paints, as formerly prepared, great trouble and vexatious delays are encountered in mixing, coloring, and otherwise preparing them for use, as they must be mixed at the time of using them, and used within a short time of mixing, and, if there be any residue, the mineral part very soon separates from the oil and settles at the bottom in a hard or semi-solid mass, unfit for use without regrinding or remixing.

To prepare it, in the first place, requires the procuring of the several ingredients, such as white lead or other metallic pigments, oil, turpentine, and the drier, all in separate packages, and in various quantities, which must be carefully and skillfully mixed in such quantities only as may be readily used up, for frequently, when it has stood for some time, it becomes so fatty as to be unfit for use, even if it were to be remixed or reground.

If a colored paint is required, many other separate packages of coloring matter must be used, which, if dry, must also be ground, and, to procure the shade desired, great skill in the application of the coloring matter is necessary; and not only with respect to the proper application of the coloring matter is skill required, but also to prepare the paint, so that when it is applied it will be of such temper and consistency as to spread well, and yet retain sufficient body to cover the surface and not run.

Now, to obviate these difficulties, it is proposed to provide a mixed liquid paint, prepared ready for use, so that when the packages are opened it will be ready for immediate use, and which will remain in such condition for any indefinite length of time.

It will be readily perceived that a paint so prepared and mixed when being manufactured, where every facility for accomplishing the same with accuracy and uniformity may be had, may be furnished to the consumer of every color and quality, with the nicest graduations, and at less cost and delay than the present paints of commerce, and the necessity for the employment of skilled persons to mix the paint is dispensed with, and all persons can do their own painting.

To this end one example is provided—viz., the following preparation: First, take two hundred pounds of the oxide of zinc in a dry state and grind it in twenty gallons of linseed-oil, to which add a compound prepared as follows, viz: Mix five pounds of the acetate of lead with ten pounds of the sulphate of zinc, in a sufficient amount of water to give a specific gravity of 3° Baumé, when the salts are dissolved. Then take a sufficient quantity of the soluble silicate of soda, dissolved in water, to make three gallons, having a specific gravity of 8° Baumé; also, prepare six gallons of a saturated solution of lime-water. Now, take three gallons of the mixture of the acetate of lead and zinc solution, with three gallons of the solution of silicate of soda, and add six gallons of the lime solution and six gallons of linseed-oil. These are all combined, and then compounded with the aforementioned two hundred pounds of ground zinc oxide and oil, after which are added six gallons of benzine, and the whole compound is then thoroughly ground together, producing a white, glossy, cheap, and durable paint. This paint may receive any color desired by adding any of the ordinary well-known pigments to the compound.

Various other modifications of the above compound may be used to advantage. For instance, as a substitute for the silicate of soda, silicate of potash, or any substance which will tend to form an emulsion with the oil or aid in suspending the pigment in it, may be used, or carbonate of lime, or chloride of calcium for the lime; also, any other suitable oil may be used instead of linseed. Turpentine may be used in place of benzine, and other equivalents of the aforesaid ingredients may be employed. Instead of using oxide of zinc in a dry state, oxide of zinc which has been previously ground in oil may be used, the proportion of oil afterward mixed being correspondingly diminished.

White lead or coloring pigment may be used in place of the aforementioned zinc. When positive colors are desired, other pigments be used, such as red, blue, brown, green, &c. The light colors or tints may also be obtained by mixing pigments in proper proportions with the compound when first prepared.

I have discovered that the above paint possesses the property of remaining in a mixed condition for an indefinite length of time without becoming fatty, as compared with other paints, and is, therefore, specially adapted to being put up in tight packages as an article of commerce.

I claim—

A mixed liquid paint, composed of oxide of zinc or other pigments, oil, turpentine, or benzine, water, and one or more emulsating agents put up in tight vessels or cans, substantially as described.

D. R. AVERILL.

Witnesses:
J. K. TAYLOR,
C. G. SABINE.